No. 777,643. Patented December 13, 1904.

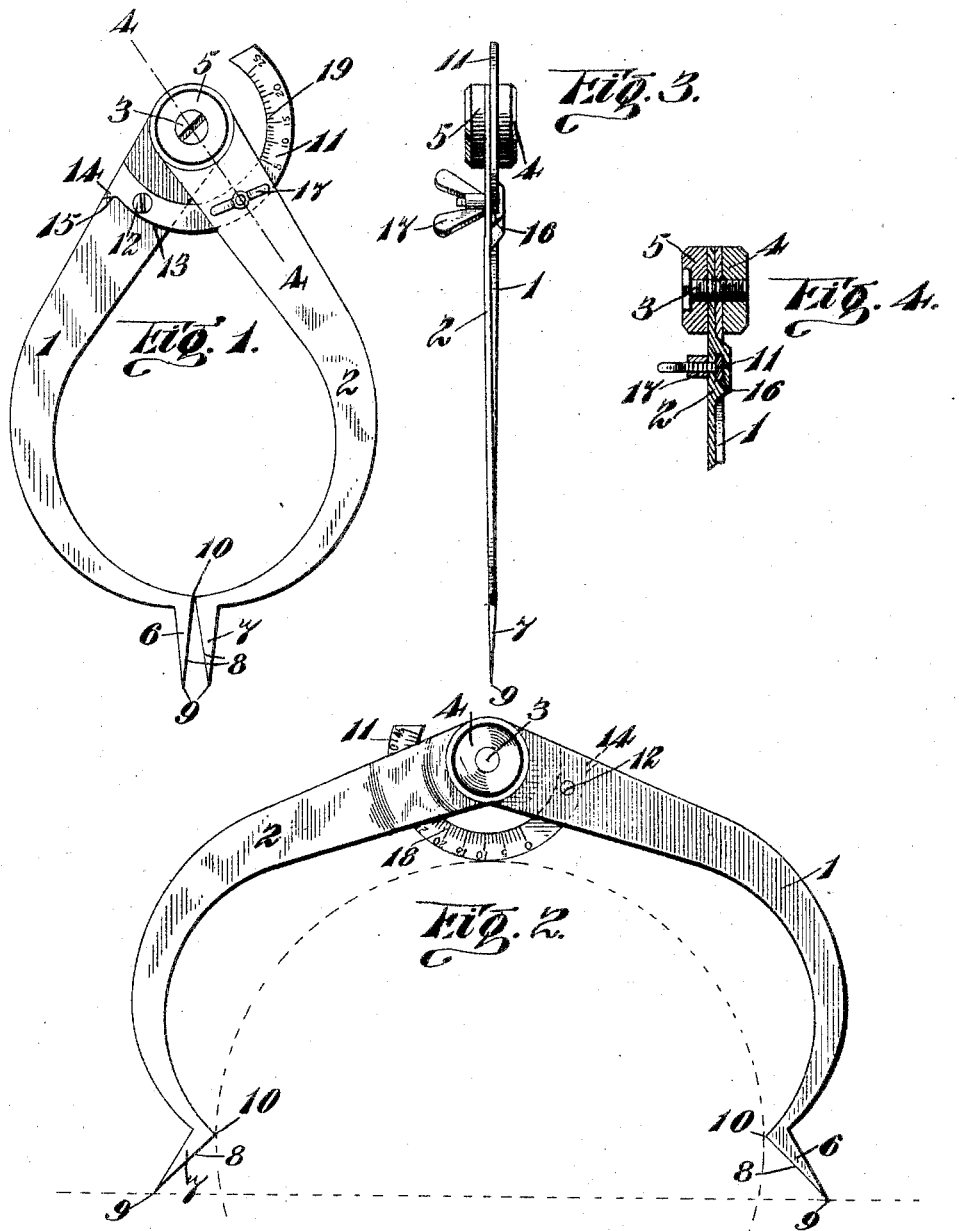

UNITED STATES PATENT OFFICE.

PHILIP H. SANGER, OF ONAWAY, MICHIGAN, ASSIGNOR OF ONE-FOURTH TO R. M. WALTON, OF ONAWAY, MICHIGAN.

COMBINED CALIPERS AND DIVIDERS.

SPECIFICATION forming part of Letters Patent No. 777,643, dated December 13, 1904.

Application filed August 4, 1904. Serial No. 219,499. (No model.)

*To all whom it may concern:*

Be it known that I, PHILIP H. SANGER, a citizen of the United States, residing at Onaway, in the county of Presque Isle and State of Michigan, have invented certain new and useful Improvements in Combined Calipers and Dividers; and I do declare the following to be a full, clear, and exact description of the invention, such as will enable others skilled in the art to which it appertains to make and use the same.

My invention relates to improvements in combination calipers and dividers.

The object of my invention is to provide a device of this character which will be simple in construction, durable in use, efficient in operation, and comparatively inexpensive to manufacture.

With the above and other objects in view the invention consists of certain novel features of construction, combination, and arrangement of parts, as will be more fully described, and particularly pointed out in the appended claims.

In the accompanying drawings, Figure 1 is a plan view of one side of my improved tool, showing its legs in their closed position. Fig. 2 is a similar view of the opposite side of the same, showing the legs in an open position. Fig. 3 is an edge view of the tool. Fig. 4 is a detail sectional view taken on the line 4 4 of Fig. 1.

Referring to the drawings by numerals, 1 and 2 denote reversely curved or bowed legs, both having their broad upper ends pivotally connected in any suitable manner. As shown, this connection is effected by passing a pivot bolt or rivet 3 through alining openings formed in said legs and through the washers 4 and 5, disposed upon opposite ends of the said pivot 3. The lower reduced ends of the legs 1 and 2 are formed with laterally-projecting feet 6 and 7. Said feet project angularly outward away from each other, their inner edges 8 being inclined to form divider-points 9 on the outer ends of said feet and caliper-points 10 upon the inner ends of the same. When the legs 1 and 2 are in their closed position, as shown in Fig. 1, the points 10 are in contact with each other and the points 9 are a short distance apart. In order to adjust the legs 1 and 2 and to indicate the adjustment of the points 9 and 10, I secure upon one of the legs an arc-shaped wing or bar 11. As shown, said wing 11 has one of its ends secured by a screw 12 in a recess 13, formed in one side of the leg 1, and in order to secure said end more firmly the same is provided with a laterally-offset portion 14, which projects into an offset portion 15 of the recess 13. The wing 11 projects and slides in a curved slot 16, formed in the leg 2, and is adapted to be secured in said slot in order to hold the legs and the points 9 and 10 in an adjusted position by a set-screw 17, which passes through a threaded opening in the leg 2 and impinges against one side of the wing 11, as clearly shown in Fig. 4 of the drawings. The free end of the wing 11 is provided upon opposite sides or faces with scales 18 and 19, with which the leg 2 coacts, to indicate the adjustment of the points 9 and 10. The scale 18 consists of suitable graduations to indicate the adjustments of the points 10, and the scale 19 upon the opposite side of the wing 11 is graduated to indicate the adjustment of the points 9.

The scales 18 and 19 may be according to the metric or other system, and their respective graduations serve to indicate the distance between the caliper and divider points of the instrument when the same is in use—that is say, when the instrument is used as a caliper the inner edge of the leg 2 will coincide with the graduation on the scale 18, which will correspond with the distance in centimeters, inches, or other units of measurement between the caliper-points 10. When the instrument is used as a divider, the outer edge of the leg 2 will coincide with the graduation on the scale 19, which will correspond in centimeters, inches, or other units of measurement with the distance between the divider-points 9.

The use, operation, and advantages of my invention will be understood from the foregoing description, taken in connection with the accompanying drawings.

It will be seen that when the set-screw 17 is loosened the legs 1 and 2 may be swung toward and from each other to set the points 9 and 10 at any desired distance from each other, which distance will be indicated upon the scales 18 and 19. By having the points 9 and 10 of the dividers and calipers upon the adjacent ends of the legs 1 and 2 it will be seen that the instrument will be comparatively short and very easy and convenient to handle. Furthermore, it will be noted that the device is very simple and durable in construction and well adapted for the purpose intended.

While I have shown and described the preferred embodiment of my invention, I wish it understood that I do not wish to be limited to the precise construction herein set forth, since various changes in the form, proportion, and the minor details of construction may be resorted to without departing from the principle or sacrificing any of the advantages of this invention.

Having thus described my invention, what I claim as new, and desire to secure by Letters Patent, is—

1. A combined caliper and divider comprising a pair of reversely-curved legs pivotally connected together at one end and each terminating at the opposite end in a caliper-point 10 and formed with an outwardly-projecting divider-point 9, radial to the pivot, and an arc-shaped bar secured to one of the legs and on which the other leg sweeps, said bar having scales on opposite sides, one of said scales coacting with the last-mentioned leg to indicate the distance between the caliper-points and the other scale coacting with the said last-mentioned leg to indicate the distance between the divider-points, substantially as described.

2. A device of the class described comprising two pivotally-connected members, one of which is formed with a slot and the other with a recess having an enlargement, and an adjusting-wing adapted to slide in said slot and having one of its ends formed with an enlargement to enter said enlarged portion of said recess, fastening means for securing the last-mentioned end of said wing in said recess and means for securing said wing in an adjusted position in said slot, substantially as described.

In testimony whereof I have hereunto set my hand in presence of two subscribing witnesses.

PHILIP H. SANGER.

Witnesses:
R. MAY WALTON,
SAMUEL S. TOWER.